March 9, 1965  A. L. RUGH  3,172,725
PRODUCTION OF SULFURIC ACID
Filed Jan. 25, 1961
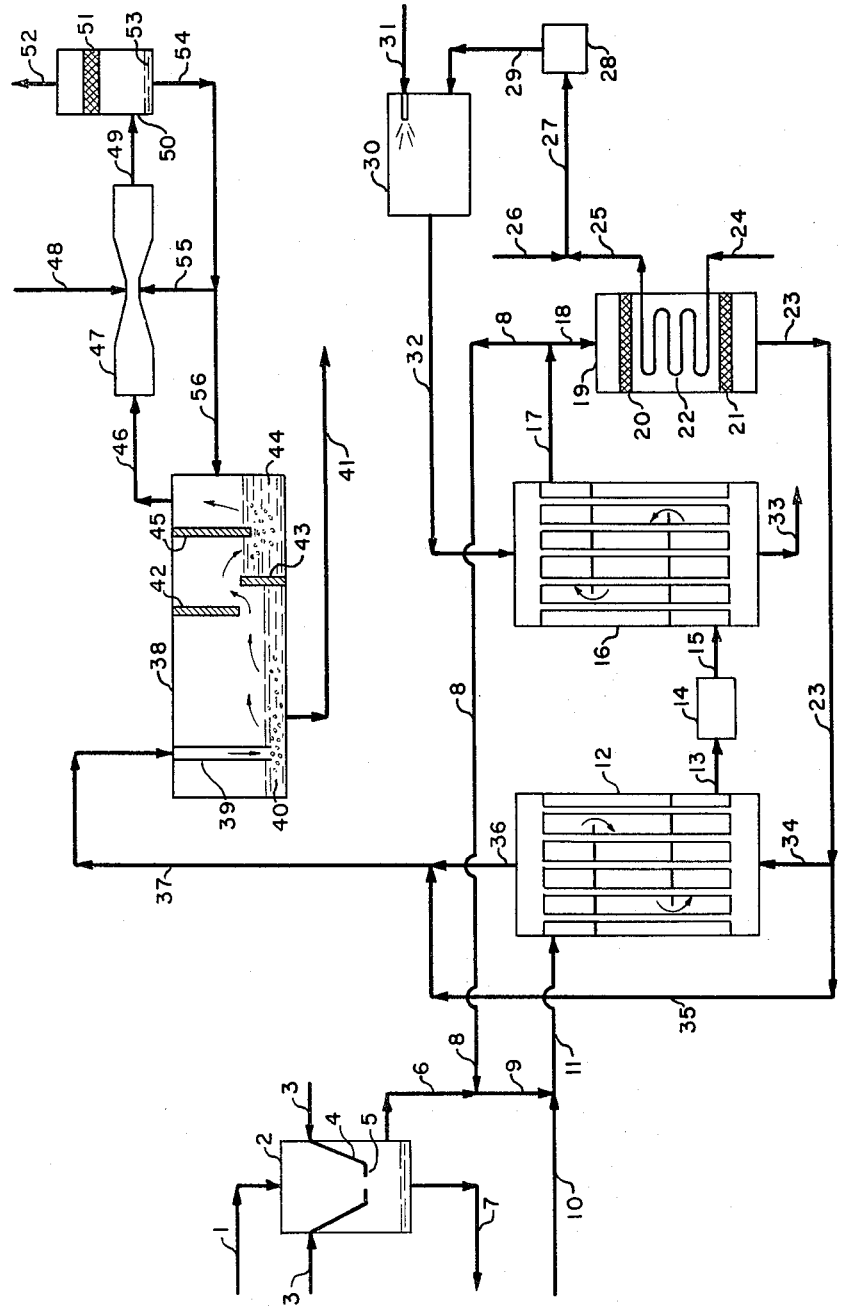
ALBERT L. RUGH
*INVENTOR.*
BY J. T. Chaloty
*AGENT*

United States Patent Office 3,172,725
Patented Mar. 9, 1965

3,172,725
PRODUCTION OF SULFURIC ACID
Albert L. Rugh, Erie, Pa., assignor to Chemical Construction Corporation, New York, N.Y., a corporation of Delaware
Filed Jan. 25, 1961, Ser. No. 84,899
4 Claims. (Cl. 23—168)

This invention relates to the production of sulfuric acid. A process has been developed whereby concentrated sulfuric acid may be economically produced from the sulfur dioxide contained in dilute gas streams, such as smelter stack gases containing from 1% to 7% sulfur dioxide. In the process of the present invention, the input gas stream is heated and maintained at an elevated temperature throughout the subsequent conversion and sulfur trioxide absorption. Thus, the development of sulfur trioxide mist or condensate is prevented, and furthermore, the process is self-concentrating with respect to the acid produced. Consequently, problems of water balance have also been eliminated.

In conventional sulfuric acid technology, sulfur is burned with pre-dried process air to produce a process gas stream containing from 8% to 12% sulfur dioxide. The resulting gas stream is then mixed with more pre-dried air, preheated by heat exchange with converted gas, and sulfur dioxide is then catalytically converted to sulfur trioxide at 700° F. to 1000° F. The converted gas stream is cooled by heat exchange, and the sulfur trioxide content is absorbed by scrubbing the gas stream with 98% sulfuric acid.

The process air streams which are employed to burn sulfur and to oxidize sulfur dioxide to sulfur trioxide must be pre-dried in conventional practice in order to avoid the presence of water vapor in the converted gas stream. Any water vapor which may be present in the converted gas stream will combine with sulfur trioxide when the gas stream is cooled, resulting in the formation of a sulfuric acid mist in the gas stream which is extremely difficult to remove or recover. The pre-drying of process air is accomplished by scrubbing the incoming air with 93% or 98% sulfuric acid in a drying tower. This process step naturally results in dilution of the scrubbing acid with the water absorbed from the air stream. The 93% acid is subsequently recycled to the process and blended with the stronger process acid streams to produce product acid of required strengths. It has been found in practice that when the initial gas strength is below about 5%, the water balance of the system becomes upset, and the quantity of water introduced with the process air is too great in proportion to the quantity of strong acid produced. This is particularly encountered in the case of metallurgical stack gases. Hence it has usually been considered economically impractical to produce sulfuric acid by conventional procedures from gas streams lean in sulfur dioxide, or gas streams high in water vapor content relative to sulfur dioxide content.

Typical gas streams of this type include stack gases produced by metallurgical smelters such as copper smelters. In some cases, the stack gases are merely dispersed to the atmosphere. Where anti-pollution restrictions prevail, or where other economic considerations may be favorable, these stack gases are scrubbed with alkaline solutions such as aqua ammonia. Several commerical facilities employ dilute ammoniacal solutions for this purpose, thereby eventually recovering the sulfur dioxide content of the stack gases, after further processing, as ammonium sulfate fertilizer.

Other gas streams lean in sulfur dioxide which may be employed in the process of the present invention include stack gases produced by power plants burning high-sulfur coal, off-gas streams derived from the disposal of ferrous sulfate pickle liquor, combustion gas streams produced by burning of certain types of low-acid petroleum refinery sludges, and by-product process gases containing hydrogen sulfide such as those produced in the manufacture of synthesis gas. Gas streams containing hydrogen sulfide would of course be preliminarily oxidized or combusted to convert hydrogen sulfide to sulfur dioxide and water vapor.

In the present invention, a process has been devised by means of which a gas stream lean in sulfur dioxide may be economically processed to recover its sulfur content as concentrated sulfuric acid. The inlet gas stream, such as a waste stack gas containing 1% to 7% sulfur dioxide, is first scrubbed with wash water if necessary, to remove entrained solids such as fly ash or dust. Sufficient air is added to the gas stream to provide required oxygen for sulfur dioxide oxidation. The gas stream is partially heated by heat exchange with hot converted gas, and further heated to required catalytic conversion temperature by additional heat exchange with an additional heat source, such as furnace combustion flue gas. The hot gas stream is next passed through the catalytic converter, in which sulfur dioxide is converted to sulfur trioxide. The converted gas is then passed in heat exchange with incoming gas, but is maintained at a highly elevated temperature above the dew point, which permits the gas stream to be employed as a concentrating agent. The gas stream is now contacted with strong aqueous sulfuric acid, and sulfur trioxide is thereby removed and absorbed into the aqueous acid solution. Sensible heat in the gas stream as well as absorption heat of reaction are utilized in this process step, to provide an evaporation and concentrating effect. Thus a final gas stream is discharged free of sulfur trioxide, but essentially saturated with water vapor.

Several important advantages are derived from this process sequence. The process features maintenance of the converted gas at a highly elevated temperature until sulfur trioxide absorption. Consequently, condensation of sulfuric acid or formation of mist in the gas stream is prevented, even though a substantial amount of water vapor may be present at this point. Thus, the pre-drying of process air or other process gas stream is eliminated, and hence the 93% acid drying tower is no longer needed. The process of the present invention makes possible the usage of very dilute gas streams, containing as low as 1% or less sulfur dioxide, in the manufacture of commercial-grade sulfuric acid. Thus the present process provides a highly economical way of eliminating pollution problems due to discharge of sulfur dioxide into the atmosphere. The present process also facilitates the treatment of dirty or dust-laden gas streams, since such streams may be preliminarily scrubbed with wash water and consequent saturation of the gas stream with water vapor is not objectionable. By suitable adjustment or modification of heat exchange temperatures and by-passes, the converted gas temperature prior to sulfur trioxide absorption may be changed so as to effect concentration of the aqueous acid solution to any desired product strength. Likewise, variations in inlet sulfur dioxide concentration may readily be accommodated in the process of the present invention without causing process upsets.

It is an object of the present invention to produce sulfuric acid from sulfur dioxide.

Another object is to convert the sulfur dioxide content of a mixed gas stream to sulfuric acid.

A further object is to economically recover the sulfur dioxide content of lean gas streams.

An additional object is to treat waste stack gases lean in sulfur dioxide so as to eliminate air pollution and effectively recover sulfur values.

Still another object is to convert sulfur dioxide to sulfur trioxide and produce sulfuric acid, from a gas stream containing water vapor, while avoiding the formation of sulfuric acid mist or condensate.

Still a further object is to provide a process for conversion of the sulfur dioxide content of a mixed gas stream to sulfuric acid which readily accommodate for fluctuations or changes in sulfur dioxide concentration in the gas stream.

These and other objects and advantages of the process of the present invention will become evident from the description which follows.

Referring to the figure, the input gas stream 1 is the gas stream lean in sulfur dioxide to be processed in accordance with the present invention. Thus for example, stream 1 could be a dust-laden waste stack gas generated by a metallurgical smelter, typically containing from 1% to 5% sulfur dioxide, by volume. Usually stream 1 will not average over 7% sulfur dioxide content, since a richer gas stream could be conveniently processed by conventional technology.

Input gas stream 1 is first passed into scrubber 2, in which the gas stream is scrubbed by wash water streams admitted via 3 so as to remove entrained dust and solids. A unit such as 2 is specifically applicable to a gas-liquid scrubbing situation in which entrained solids may tend to cause clogging or plugging. Thus, streams 3 are dispersed onto and flow downwards across constricting baffles 4, and consequently deposition of solid material on baffles 4 is prevented. The water is next directed horizontally by lips 5, or substantially transverse to the gas stream. The constriction of gas flow path provides maximum gas stream velocity at or near lips 5, and consequently the scrubbing action of the water injected transverse to the high velocity gas stream provides a highly effective scrubbing action. The washed gas stream, now free of entrained solid particles, is removed from unit 2 via 6, while the dirty wash water is recovered via 7 and may be recycled to 3 after settling or filtering.

It will be evident that other scrubbing means or devices may be employed to accomplish the washing effect of scrubber 2. However, it has been found that the scrubbing process when carried out in the manner described supra is highly effective, and is a preferable means of accomplishing the gas washing. It will be obvious that in cases where gas stream 1 is free of entrained solids, gas washing will be omitted from the process.

Washed gas stream 6 is now substantially saturated with water vapor at the scrubber exit temperature, which may range from about 100° F. to 175° F., depending on various process factors. In addition, entrained water droplets may be present in the gas stream. In order to avoid condensation and to evaporate entrained liquid water, the gas stream 6 is first combined with hot recycle gas stream 8, derived from a later section of the process at a temperature between about 700° F. to 1000° F. The combined gas stream 9 is thus formed at a higher intermediate temperature between about 165° F. to 240° F. Air may be added to stream 9 via 10, at a sufficient rate to provide the required amount of free oxygen for complete conversion of sulfur dioxide to sulfur trioxide in the subsequent catalytic oxidation step of the process. The resulting combined process gas stream 11 is now passed into heat exchanger 12. It should be noted that stream 1 may originally contain a sufficient amount of free oxygen for sulfur trioxide formation, in which case air stream 10 may be omitted.

The temperature of stream 11 is raised in heat exchanger 12 by heat exchange with hot converted gas. Stream 11 must be heated to the required temperature level between 700° F. to 1000° F., prior to catalytic conversion of sulfuric dioxide to trioxide. However, the requisite total amount of heating is not applied to stream 11 in exchanger 12, for a variety of reasons. First, due to the comparatively low level of sulfur dioxide in the process gas, the total required amount of heat cannot be obtained as heat generated by the catalytic oxidation of sulfur dioxide. Second, in the present process, the final converted gas must be removed from the conversion section at an elevated temperature level for effective evaporation in subsequent process steps, as will appear infra. Third, circulation of the gas stream through the process by a main process blower is most suitably accomplished at an intermediate temperature level, below that required for catalytic conversion but somewhat above the dew point at which condensation can occur.

Thus, the heated process gas stream is removed from exchanger 12 via 13 at a temperature of about 300° F. to 400° F., and pressurized for passage through the balance of the process by main blower 14. The gas stream next passes via 15 to heat exchanger 16, in which the gas stream is heated to the temperature level between 700° F. to 1000° F. required for catalytic conversion. The catalytic conversion may be carried out at temperatures outside this range, however at lower temperatures the reaction rate is slow and at temperatures above about 1150° F. severe overheating of the catalyst may occur.

The heated gas stream now leaves exchanger 16 via 17, and is split into hot recycle gas stream 8 and converter feed gas stream 18. Stream 8 is utilized as described supra, while stream 18 now passes into converter 19. Converter 19 is provided with a plurality of catalyst beds such as 20 and 21 in most cases, with interbed cooling by coils 22, in order to control the temperature rise due to the exothermic nature of the sulfur dioxide oxidation reaction. The converted gas stream leaves unit 19 via 23 at a temperature level approximately equal to the inlet temperature of stream 18, and with practically all sulfur values in the form of sulfur trioxide.

Converter cooling coils 22 may be provided with any suitable cooling agent, however, in a preferred embodiment combustion air stream 24 is preheated in coils 22. The resulting heated air stream 25 is now combined with additional combustion air stream 26, and the combined air stream 27 is passed to combustion air blower 28. The entire volume of air stream 27 is usually not passed through coils 22 because the resulting temperature drop of the process gas stream in the intercooling section would be too great, particularly in the case of process upsets.

The combustion air stream now passes from blower 28 via 29 to furnace 30, in which a liquid or gaseous hydrocarbon fuel stream 31 is burned with combustion air stream 29 to provide combustion flue gas stream 32. Alternative fuels sources may be employed to provide hot gas stream 32, such as an incandescent coke bed through which stream 29 may be blown. In any case, flue gas stream 32 is generated in furnace 30, at a temperature usually between 1000° F. to 1200° F., and passed into heat exchanger 16. Thus stream 32 is employed to heat the incoming process gas stream 15 to the required catalytic conversion temperature. The cooled flue gas stream is removed from exchanger 16 via 33, typically at a temperature between 400° F. to 600° F., and discharged to a stack. In some cases it will be economically attractive to first pass stream 33 in heat exchange with combustion air stream 26 or 27 by means not shown, so as to recover sensible heat in stream 33 by preheating the combustion air. As another process alternative, in some instances depending on apparatus configuration and resulting heat transfer cooling rates, it may be found that the passage of ambient air stream 24 through coil 22 may result in localized cooling of the process stream below the dew point. Should this happen, process upsets or corrosion could occur due to deposition of acidic condensate or solid sulfates on the exterior of coils 22. Hence as a process alternative, since usually only about 100° F. decrease in process gas stream temperature is required between beds 20 and 21, it may prove expedient to pass cooled flue gas stream 33 through coil 22 as an alternative cooling agent. Thereafter stream 33 could additionally be employed to preheat combustion air stream 27 as mentioned supra.

Returning now to converter 19, converted gas stream 23 is removed at a temperature between 700° F. to 1000° F., and passed via 34 through heat exchanger 12 in heat exchange with incoming process gas stream 11. As a control measure, a portion of the converted gas stream 23 may be by-passed around exchanger 12 via 35, to join the cooled converted gas stream 36 and form a recombined converted gas stream 37 downstream of unit 12. The use of by-pass stream 35 is a highly important control measure, since it is most important that stream 37 be obtained at a highly elevated temperature, usually above 450° F. A principal reason for this is that stream 37 is subsequently employed not only to supply its sulfur trioxide for sulfuric acid formation, but also, as will appear infra, stream 37 provides an evaporative concentration effect on the aqueous sulfuric acid employed to absorb the sulfur trioxide.

Stream 37 is thus passed at a temperature above 450° F., into scrubber-absorber unit 38, which is a vessel provided with various means for elevated temperature gas-liquid contact. Thus, stream 37 passes via pipe 39 to a point below the indicated level of strong acid solution 40 in vessel 38. This liquid level is actually not present in practice since the indicated level is that which would be present if the liquid was quiescent. In actual practice, a dynamic equilibrium is established whereby gas stream 37 is violently dispersed into liquid 40 and no actual liquid surface is present. This type of gas-liquid contact is particularly suitable in the present invention, where the gas phase is at highly elevated temperature, corrosive components are being reacted, and the reactions involved in the absorption of sulfur trioxide are highly exothermic.

By suitable control of the temperature of gas stream 39, the concentration of acid solution 40 is maintained at a desired product level, usually between the commercial grades of 77% to 93%, which correspond to 60° Bé. and 66° Bé. acid respectively. The acid solution is thus maintained at a dynamic boiling temperature, and product strong acid is withdrawn via 41. It should be understood that in practice acid solution 40 will be boiling under flash evaporation conditions. Consequently, the temperature of solution 40 when boiling will actually be below the standard atmospheric pressure boiling point. Thus, the standard boiling point for 93% acid is 540° F. Under the dynamic equilibrium conditions established in unit 38, the liquid phase 40 will boil at about 445° F. when the solution acid strength is 93%. Similarly, a 77% acid will boil at about 320° F. instead of the standard 390° F. boiling point for this strength of acid. This boiling point lowering is naturally advantageous since corrosion is reduced at the lower temperatures.

The gas stream 39 contacts liquid phase 40, and sulfur trioxide is absorbed from the gas phase into the liquid solution. In addition, the liquid phase is concentrated due to evaporation of water into the hot gas. The gas stream is thus cooled and scrubbed, and sulfur trioxide content is lowered. Some sulfuric acid mist or droplets may be entrained in the gas phase, which now passes under de-entrainment baffle 42, over weir 43, and into weaker acid solution 44 which is typically maintained at about 63% acid strength. Weir 43 may be provided with a further upward extension, not shown, in which case a liquid outlet slot would be provided in weir 43 to allow dilute acid stream 44 to flow into and combine with strong solution 40. Baffle 45 is provided to force the gas stream into contact with solution 44. Substantially complete removal of sulfur trioxide from the gas phase now takes place. The gas phase, free of sulfur trioxide but containing some entrained acid mist and droplets, is now removed from unit 38 via 46 and directed through a mist removal unit such as venturi scrubber 47. In unit 47, the gas stream velocity is accelerated by flow path constriction, and scrubbing liquid such as water stream 48 or dilute acid stream 55 is transversely injected. The acid mist and droplets are thus scrubbed into the liquid phase, and the resulting process stream now passes via 49 into phase separator or demister 50, which may be provided with droplet filter means such as packed section 51. Unit 50 is preferably a circular cylindrical vessel, with stream 49 being admitted tangentially to the wall of vessel 50, so as to provide a cyclonic swirl effect, thereby facilitating the removal of liquid solution from the gas phase. Additional liquid spray means, not shown, may also be provided in vessel 50. The final cleaned gas is passed via 52 to stack disposal, while the separated liquid phase is collected as pool 53 and removed via 54. A portion of this dilute acid stream 54 may be recycled to gas scrubbing via 55, while the balance passes via 56 to joint dilute acid stream 44. It should be understood that stream 56 may be sprayed into acid solution 44 from an upper spray nozzle, not shown. Likewise, a portion of stream 44 may be sprayed into solution 40 by means of an upper spray nozzle, not shown, which may be placed at the top of unit 38. Alternative gas-liquid contact procedures or apparatus, besides that embodied in unit 38, will occur to those skilled in the art. However, the system employed in unit 38 as described supra is considered to be a preferred and most desirable embodiment of the present invention, since all of the various functions such as gas-liquid contact, absorption of sulfur trioxide, evaporation of water from the acid solution, and cooling of the gas stream, are all accomplished in a most expedient manner in unit 38.

An example of a preferred application of the present invention to copper smelter stack gas will now be described, to illustrate the best mode of carrying out the process of the present invention.

*Example*

A waste stack gas from a copper smelter was treated in accordance with the present invention. The stack gas was received at an average flow rate of 14,000 cubic feet per minute, with an initial temperature of 800° F. The gas contained 2% sulfur dioxide and also had a dust loading of 100 milligrams per cubic foot.

The gas was first scrubbed with wash water to remove entrained dust. The resulting clean gas stream was recovered at 145° F., and was saturated with water vapor. Hot recycle gas and ambient air were mixed with the clean gas stream, to yield a combined gas stream at 210° F. This gas stream was then heated to 360° F. by heat exchange with the converted gas stream, passed through the main system blower, and finally heated to 830° F. by heat exchange with combustion flue gas. The gas stream was then split, with a portion being recycled as the aforementioned hot recycle gas and the balance passing through a two-stage converter in which sulfur dioxide was catalytically converted to sulfur trioxide. Interstage cooling was provided by heat exchange with ambient air which was preheated to 375° F. and utilized as combustion air. The converted gas stream was removed from the catalytic converter at 840° F.

The preheated combustion air was mixed with additional ambient air, and the mixed air stream at 140° F. was preheated to 300° F. by heat exchange with combustion flue gas. The preheated combustion air was then passed into the combustion furnace where 40 gallons per hour of oil was burned, to produce a combustion flue gas at 1050° F. This flue gas was employed to preheat the process gas stream to 830° F., and the cooled flue gas recovered at 370° F. was then employed to preheat combustion air as described supra. The final flue gas was discharged to a stack.

The converted process gas stream, recovered at 840° F., was passed first in heat exchange with incoming process gas and cooled to 700° F. The gas stream was then passed to the absorber-concentrator in which a liquid solution strength of 93% sulfuric acid was maintained at a temperature of 445° F. The gas stream, after contacting the 93% solution, was successively contacted with 63% acid at 245° F. in a supplementary section of the unit, and finally scrubbed with 10% acid to remove acid mist in a venturi scrubber. After de-entrainment of 10% acid, the clean and essentially sulfur-free stack gas, now saturated with water vapor, was discharged from the process. A portion of the 10% acid was recycled to the venturi scrubber, and the balance was added to the 63% acid. Similarly, a portion of the 63% acid was sprayed into the 93% acid solution, while product 93% acid was withdrawn from the bottom of the absorber-concentrator unit.

What I claim is:

1. Process of producing sulfuric acid from a gas stream containing water vapor, entrained solids, and about 1% to 5% sulfur dioxide content, which comprises scrubbing said gas stream with wash water whereby said entrained solids are removed and the gas stream is cooled to between about 100° F. to 175° F., combining said gas stream with a hot recycle gas stream to obtain a combined gas stream temperature between about 165° F. to 240° F., partially heating said combined gas stream by heat exchange with converted gas stream containing sulfur trioxide to a temperature of about 300° F. to 400° F., further heating said gas stream to conversion inlet temperature of about 700° F. to 1000° F. by heat exchange with a flue gas derived at a temperature of 1000° F. to 1200° F. from a hydrocarbon combustion furnace, recycling a portion of said heated gas stream as said hot recycle gas stream, catalytically converting the sulfur dioxide content of the balance of said gas stream to sulfur trioxide, preheating at least a portion of the combustion air provided for said hydrocarbon combustion furnace by heat exchange with said gas stream during said catalytic conversion step, partially cooling the converted gas stream by said heat exchange with combined gas stream to a lower temperature above 450° F., contacting said converted gas stream with aqueous sulfuric acid solution whereby sulfur trioxide content is absorbed from said gas stream into said aqueous sulfuric acid solution and water is evaporated from said solution, said solution having an acid strength between about 77% to 93%, and discharging residual gas stream essentially free of sulfur values and substantially saturated with water vapor.

2. Process of claim 1, in which said aqueous sulfuric acid solution is of 93% acid strength.

3. Process of claim 1, in which said aqueous sulfuric acid solution is maintained at a sufficiently elevated temperature in the range of 320° F. to 445° F., whereby boiling of said solution takes place.

4. Process of claim 1, in which said gas-liquid contact between converted gas stream and aqueous sulfuric acid solution is carried out by passing said gas stream into a continuous body of said solution which is maintained in an agitated state by said gas stream.

References Cited by the Examiner
UNITED STATES PATENTS

| | | | |
|---|---|---|---|
| 1,405,669 | 2/22 | Chase et al. | 23—176 |
| 1,477,107 | 12/23 | Carey | 23—176 |
| 1,660,511 | 2/28 | Jeager | 23—175 X |
| 1,930,125 | 10/33 | Fowler | 23—176 |
| 2,019,893 | 11/35 | Clark | 23—175 |
| 2,028,416 | 1/36 | Silsby | 23—175 |
| 2,031,215 | 2/36 | Hobler | 23—162 |
| 2,188,324 | 1/40 | Waltall | 23—168 |
| 2,655,431 | 10/53 | Allen et al. | 23—168 |
| 2,879,135 | 3/59 | Haltmeier | 23—168 |

OTHER REFERENCES

Fairlie: "Sulfuric Acid Manufacture," copyright 1936, Reinhold Publishing Corp., pages 357–359.

MAURICE A. BRINDISI, Primary Examiner.
GEORGE D. MITCHELL, Examiner.